(12) United States Patent
Yamamoto

(10) Patent No.: US 9,996,931 B2
(45) Date of Patent: Jun. 12, 2018

(54) METHOD FOR CALIBRATING CAMERA MEASUREMENT SYSTEM

(75) Inventor: Hideaki Yamamoto, Tokyo (JP)

(73) Assignee: MITSUBISHI HEAVY INDUSTRIES MACHINE TOOL CO., LTD., Ritto-Shi, Shiga (JP)

( * ) Notice: Subject to any disclaimer, the term of this patent is extended or adjusted under 35 U.S.C. 154(b) by 392 days.

(21) Appl. No.: 14/361,361

(22) PCT Filed: Feb. 24, 2012

(86) PCT No.: PCT/JP2012/054508
§ 371 (c)(1),
(2), (4) Date: Jul. 9, 2014

(87) PCT Pub. No.: WO2013/099302
PCT Pub. Date: Jul. 4, 2013

(65) Prior Publication Data
US 2014/0340508 A1 Nov. 20, 2014

(30) Foreign Application Priority Data

Dec. 26, 2011 (JP) .................................. 2011-283051

(51) Int. Cl.
*H04N 9/47* (2006.01)
*G06T 7/00* (2017.01)
(Continued)

(52) U.S. Cl.
CPC ........ *G06T 7/0018* (2013.01); *B23Q 17/2233* (2013.01); *B23Q 17/249* (2013.01);
(Continued)

(58) Field of Classification Search
USPC .......................................................... 348/94
See application file for complete search history.

(56) References Cited

U.S. PATENT DOCUMENTS

2004/0170315 A1* 9/2004 Kosaka .................... G06T 7/80
382/154
2005/0102060 A1* 5/2005 Watanabe .............. B25J 9/1697
700/245

(Continued)

FOREIGN PATENT DOCUMENTS

CN 102159917 A 8/2011
JP 4-365585 A 12/1992
(Continued)

OTHER PUBLICATIONS

Chinese Official Action dated Oct. 9, 2015 issued in corresponding Chinese Application No. 201280052858.1 with an English Translation.
(Continued)

*Primary Examiner* — Behrooz Senfi
*Assistant Examiner* — Ana Picon-Feliciano
(74) *Attorney, Agent, or Firm* — Birch, Stewart, Kolasch & Birch, LLP

(57) ABSTRACT

In a calibration method a ring-shaped jig is disposed on a machine tool workpiece. The optical axis of a camera is aligned parallel to an axis of the machine tool. The jig is photographed with the horizontal or the vertical direction of the camera aligned with an axial direction other than the signal direction of the machine tool. The circumferential shape of the jig in the photograph is extracted as a contour. The center position of the jig in the image is calculated from the contour while all distortion correction coefficients in tangential and radial directions are ignored and set to zero. The displacements of the main point of the camera are set to zero. The translation distance, which is an external parameter of calibration, is calculated based on the center position of the jig in the image and the known three-dimensional center position of the jig.

2 Claims, 11 Drawing Sheets

(51) Int. Cl.
*B23Q 17/22* (2006.01)
*B23Q 17/24* (2006.01)
*G06T 5/00* (2006.01)
*G06T 7/60* (2017.01)
*H04N 17/00* (2006.01)
*G06T 7/80* (2017.01)
*G06T 7/73* (2017.01)

(52) U.S. Cl.
CPC .......... *B23Q 17/2428* (2013.01); *G06T 5/002* (2013.01); *G06T 7/60* (2013.01); *G06T 7/73* (2017.01); *G06T 7/80* (2017.01); *H04N 17/002* (2013.01); *G06T 2207/30244* (2013.01)

(56) References Cited

U.S. PATENT DOCUMENTS

2007/0286456 A1* 12/2007 Ariyur .................. G06K 9/32
                                                          382/103
2009/0190826 A1*  7/2009 Tate ................... H04N 1/00002
                                                          382/153
2010/0302366 A1   12/2010 Zhao et al.

FOREIGN PATENT DOCUMENTS

| JP | 2568005 B2 | 10/1996 |
| JP | 3409931 B2 | 3/2003 |
| JP | 3477139 B2 | 9/2003 |
| JP | 3512092 B2 | 1/2004 |
| JP | 3575165 B2 | 7/2004 |
| JP | 3737919 B2 | 11/2005 |
| JP | 2008-14940 A | 1/2008 |
| JP | 2010-139329 A | 6/2010 |
| JP | 2010-276603 A | 12/2010 |
| JP | 2011-112379 A | 6/2011 |
| JP | 2011-177845 A | 9/2011 |
| JP | 2011-220752 A | 11/2011 |

OTHER PUBLICATIONS

"Research of Camera Calibration Adapted to Free Views", Tomohiro Kubo, 85 pages.
A Camera Claibration Technique for High Precision 3D Shape Reconstruction, Eiichi Iwanari, Yutaka Maruoka and Yoshihiro Okada, Sep. 2004, 4 pages.
Camera calibration and 3D reconstruction—opencv 2.2 documentation, http://opencv.jp/opencv-2svn/cpp/calib3d_camera_calibration_and_3d reconstruction.html, Oct. 31, 2011—28 pages.
Camera Calibration, http://opencv.jp/sample_calibration.html, Jul. 2009.
International Search Report and Written Opinion of the International Searching Authority dated Apr. 24, 2012 with English translation.
Notice of Allowance dated Sep. 29, 2015 issued in corresponding Japanese Application No. 2011-283051.
Zhengyou Zhang, "A Flexible New Technique for Camera Calibration", IEEE Transactions on Pattern Analysis and Machine Intelligence, Nov. 2000, vol. 22, No. 11, pp. 1330-1334.

* cited by examiner

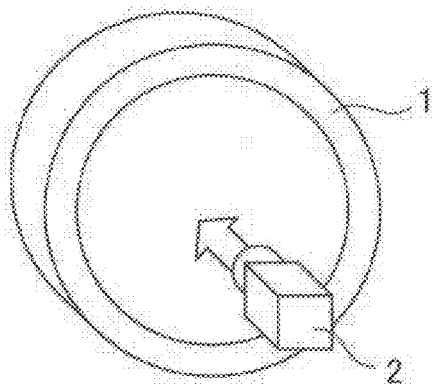
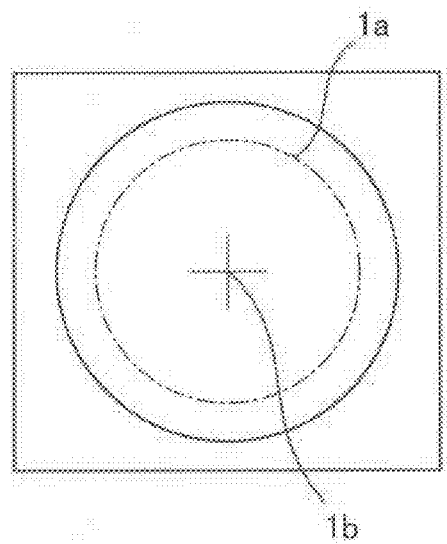
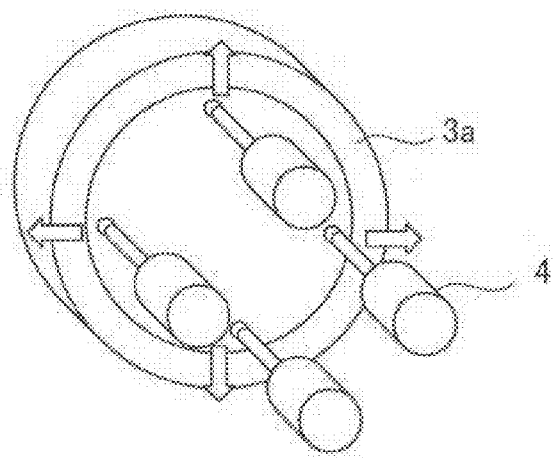

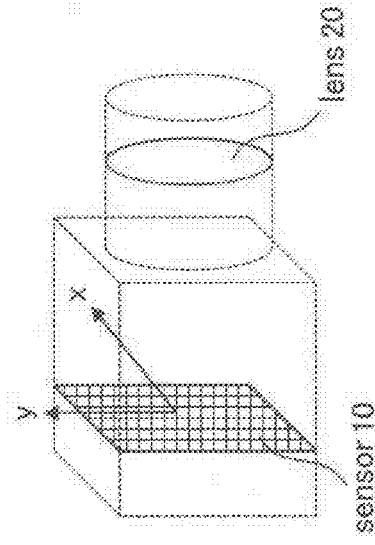
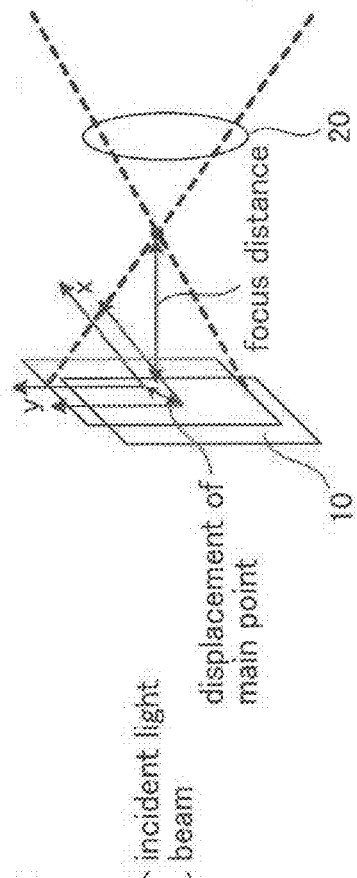
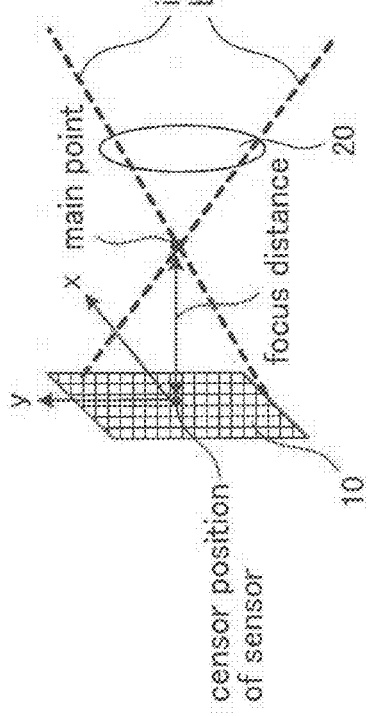

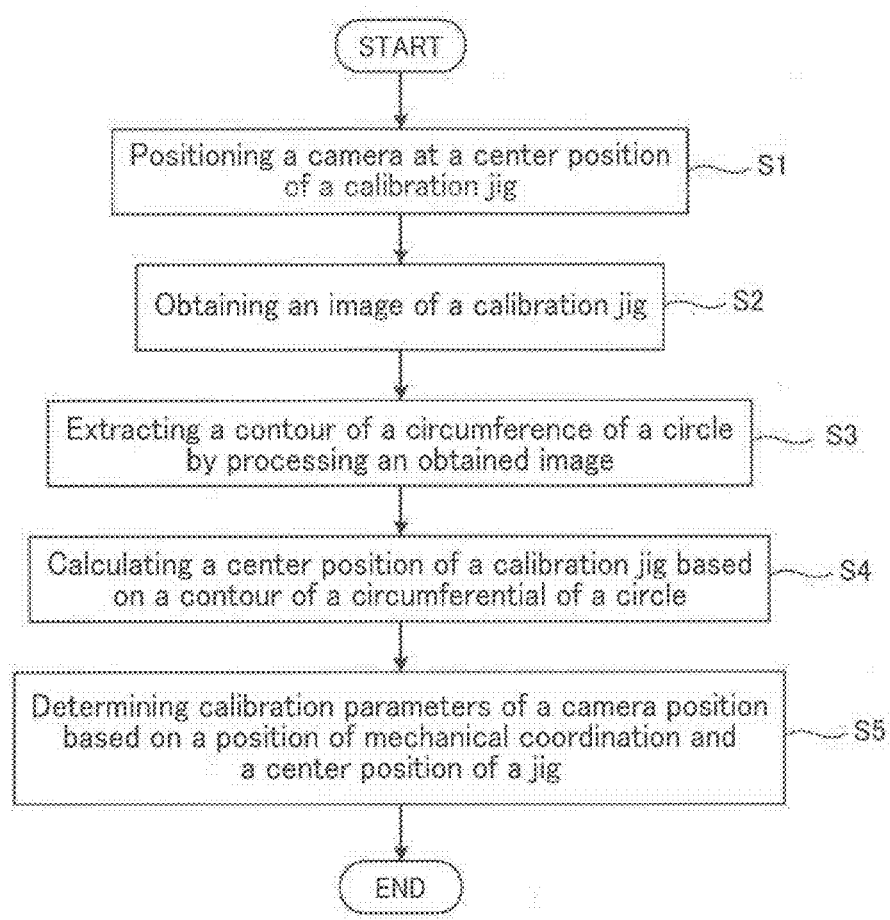

METHOD FOR CALIBRATING CAMERA MEASUREMENT SYSTEM

FIELD OF THE INVENTION

The present invention relates to a method for calibration camera measurement system, particularly to a calibration method utilized for a system for measuring a hole shape (a center position of a hole) in a machine tool.

BACKGROUND OF THE INVENTION

Recently, a measurement system using a camera is broadly utilized. However, in order to accurately measure, a calibration process is necessary with respect to the camera. Usually, in the case of a camera calibration, twelve parameters in the equation (14) have to be determined in a projection matrix 3×4) in the item [No. 7].

In the calibration method utilized by Z. Zhang (Not Patent Document 2) described in OenCV (Not Patent Document 1), it is necessary to determined nine interior parameters (four calibration parameters in a camera and five distortion correction parameters) in a camera. Further, it is also necessary to determine six exterior parameters (three translation parameters and three rotational parameters as a camera position calibration) with respect to the camera.

Patent Document 1 (CALIBRATING DEVICE FOR CALIBRATION AND MEASUREMENT SYSTEM COMPRISING CALIBRATION DEVICE) describes the following Patent Documents in which a calibration jig is described.

Patent Document 2: GNIFICATION CALIBRATION PLATE FOR IMAGE PROCESSING/MEASURING SYSTEM Patent Document 3: GAUGE, SIZE CALIBRATING DEVICE USING THE GAUGE, AND SIZE CALIBRATING METHOD Patent Document 4: CALIBRATION DEVICE Patent Document 5: CALIBRATION JIG AND METHOD FOR IMAGE RECOGNITION DEVICE Patent Document 6: DEVICE AND METHOD FOR CALCULATING REFERENCE POINT OF TARGET FOR PHOTOGRAMMETRY, AND RECORDING MEDIUM STORED WITH PROGRAM FOR CALCULATING REFERENCE POINT OF TARGET FOR PHOTOGRAMMETRY In addition except the above Patent Documents, the following Patent Documents describe a calibration method using a camera for measuring.

Patent Document 7: CAMERA CALIBRATION METHOD FOR CAMERA MEASUREMENT OF PLANAR SUBJECT AND MEASURING DEVICE APPLYING SAME Patent Document 8: CALIBRATING DEVICE FOR CALIBRATION AND MEASUREMENT SYSTEM COMPRISING CALIBRATION DEVICE Patent Document 9: CALIBRATION METHOD AND CALIBRATION DEVICE Patent Document 10: METHOD FOR CALIBRATING ROBOT AND ROBOT CALIBRATION DEVICE Patent Documents 11 and 12: SETTING METHOD FOR PERPENDICULARITY, DISTANCE, AND ROTATION ANGLE OF HAND EYE

PRIOR ART TECHNICAL DOCUMENT

Patent Publications

Patent Document 1: Japanese Patent Unexamined Publication No. 2010-139329
Patent Document 2: Japanese Patent No. 3409931
Patent Document 3: Japanese Patent No. 3477139
Patent Document 4: Japanese Patent No. 3512092
Patent Document 5: Japanese Patent No. 3575165
Patent Document 6: Japanese Patent No. 3737919
Patent Document 7: Japanese Patent Unexamined Publication No. 2008-14940
Patent Document 8: Japanese Patent Unexamined Publication No. 2010-139329
Patent Document 9: Japanese Patent Unexamined Publication No. 2010-276603
Patent Document 10: Japanese Patent Unexamined Publication No. 2011-177845
Patent Document 11: Japanese Patent Unexamined Publication No. Hei4-365585
Patent Document 12: Japanese Patent No. 2568005

Not-Patent Publication

Not Patent Document 1:
http://opencv.jp/opencv-2svn/cpp/calib3d_camera_calibration_and_3d_reconstruction.html
Not Patent Document 2:
http://opencv.jp/sample_calibration.html

SUMMARY OF THE INVENTION

Subject to be Solved by the Invention

There are some problems in view of a manufacture of a calibration jig described as the above Patent Documents. Further, there are some difficulties in view of a calibration method as described below.

<Calculation of Calibration>

In each coordination system, coordination is calculated through the following process.

$\vec{X}_{world} = [X_{world}, Y_{world}, Z_{world}, 1]^T$: Coordination of world coordination system $\vec{X}_{camera} = [X_{camera}, Y_{camera}, Z_{camera}, 1]^T$: Coordination of Camera coordination system $\vec{U}_{image} = [U_{image}, V_{image}, 1]^T$: Coordination projected on image plane [No. 1]

At first, it will be described about interior parameters of a camera. As shown in FIG. 4, a coordinate of a point projected on an image plane is indicated by the following equations.

[No. 2]

$$\frac{x}{f} = -\frac{X}{Z} \quad (1)$$

$$\frac{y}{f} = -\frac{Y}{Z}$$

$$x = -\frac{f}{s_x}\frac{X}{Z} + c_x$$

-continued $$y = -\frac{f}{s_y}\frac{Y}{Z} + c_y \quad (2)$$

Thus, a relation between the camera coordination and the image plane coordination is indicated by the following equation.

[No. 3]

$$S\begin{bmatrix} U_{image} \\ V_{image} \\ 1 \end{bmatrix} = \begin{bmatrix} k_x & 0 & c_x \\ 0 & k_y & c_y \\ 0 & 0 & 1 \end{bmatrix}\begin{bmatrix} f & 0 & 0 & 0 \\ 0 & f & 0 & 0 \\ 0 & 0 & 1 & 0 \end{bmatrix}\begin{bmatrix} X_{camera} \\ Y_{camera} \\ Z_{camera} \\ 1 \end{bmatrix} \quad (3)$$

$$= \begin{bmatrix} fk_x & 0 & c_x & 0 \\ 0 & fk_y & c_y & 0 \\ 0 & 0 & 1 & 0 \end{bmatrix}\begin{bmatrix} X_{camera} \\ Y_{camera} \\ Z_{camera} \\ 1 \end{bmatrix} \quad (4)$$

Herein, $k_x = 1/s_x$, $k_y = -1/s_y$, $s_x$ and $s_y$ indicates image pixel size and a displacement ($c_x$, $c_y$) between a focus point f and a main point is an interior parameter, respectively. In addition, four interior parameters ($k_x$, $k_y$, $c_x$, $c_y$) have to be detected. Accordingly, the total number of the interior parameters is nine by adding five distortion correction parameters ($k_1$, $k_2$, $k_3$, $p_1$, $p_2$) with the four interior parameters described before.

As interior parameters in a camera, there are distortion correction coefficients $k_1$, $k_2$, $k_3$) in the radial direction and distortion correction coefficients ($p_1$, $p_2$) in the radial direction. Such interior parameters are determined by the calibration.

[No. 4]

$$X_{camera} = (1 + k_1 r^2 + k_2 r^4 + k_3 r^6)X_c + p_1(r^2 + 2X_c^2) + 2p_2 X_c Y_c \quad (5)$$

$$Y_{camera} = (1 + k_1 r^2 + k_2 r^4 + k_3 r^6)X_c + p_2(r^2 + 2Y_c^2) + 2p_1 X_c Y_c \quad (6)$$

$$Z_{camera} = c \quad (7)$$

($X_c$, $Y_c$, $Z_c$): coordination of camera coordination system including distortion $$r^2 = X_c^2 + Y_c^2$$

(Note). Unless distortion is existing, the equations are as follows:

$$X_{camera} = X_c \quad (5')$$

$$Y_{camera} = Y_c \quad (6')$$

$$Z_{camera} = Z_c \quad (7')$$

A relation between the world coordination and the camera coordination is indicated by the following equations.

[No. 5]

$$\vec{X}_{camera} = \vec{R} * \vec{X}_{world} + \vec{T} \quad (9)$$

[No. 6]

$$\begin{bmatrix} X_{camera} \\ Y_{camera} \\ Z_{camera} \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}\begin{bmatrix} X_{world} \\ Y_{world} \\ Z_{world} \\ 1 \end{bmatrix} \quad (10)$$

Herein, $\vec{R}$ and $\vec{T}$ are exterior parameters of the calibration. $\vec{R}$ indicates a rotational angle (rotational movement) of a camera and $\vec{T}$ indicates a setting position (translation distance).

Exterior paramater(rotation):

$$\vec{R} = \begin{bmatrix} r_{11} & r_{12} & r_{13} \\ r_{21} & r_{22} & r_{23} \\ r_{31} & r_{32} & r_{33} \end{bmatrix} \quad (11)$$

$$= \begin{bmatrix} \cos\partial z & -\sin\partial z & 0 \\ \sin\partial z & \cos\partial z & 0 \\ 0 & 0 & 1 \end{bmatrix}\begin{bmatrix} \cos\partial y & 0 & \sin\partial y \\ 0 & 1 & 0 \\ -\sin\partial y & 0 & \cos\partial y \end{bmatrix}$$

$$\begin{bmatrix} 1 & 0 & 0 \\ 0 & \cos\partial x & -\sin\partial x \\ 0 & \sin\partial x & \cos\partial x \end{bmatrix}$$

$\partial x$: rotational angle with respect to $X$-axis
$\partial y$: rotational angle with respect to $Y$-axis
$\partial z$: rotational angle with respect to $Z$-axis Exterior parameter (translation):

$$\vec{T} = \begin{bmatrix} t_x \\ t_y \\ t_z \end{bmatrix}$$

Accordingly, as the exterior parameters, six parameters ($\theta x$, $\theta y$, $\theta z$, tx, ty, tz) should be determined. An equation for transferring the world coordination to the image plane is as follows.

[No. 7]

$$S\begin{bmatrix} U_{image} \\ V_{image} \\ 1 \end{bmatrix} = \begin{bmatrix} k_x & 0 & c_x \\ 0 & k_y & c_y \\ 0 & 0 & 1 \end{bmatrix}\begin{bmatrix} f & 0 & 0 & 0 \\ 0 & f & 0 & 0 \\ 0 & 0 & 1 & 0 \end{bmatrix}\begin{bmatrix} X_{camera} \\ Y_{camera} \\ Z_{camera} \\ 1 \end{bmatrix} \quad (3)$$

$$= \begin{bmatrix} fk_x & 0 & c_x & 0 \\ 0 & fk_y & c_y & 0 \\ 0 & 0 & 1 & 0 \end{bmatrix}\begin{bmatrix} X_{camera} \\ Y_{camera} \\ Z_{camera} \\ 1 \end{bmatrix} \quad (4)$$

$$= \begin{bmatrix} fk_x & 0 & c_x & 0 \\ 0 & fk_y & c_y & 0 \\ 0 & 0 & 1 & 0 \end{bmatrix}\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}\begin{bmatrix} X_{world} \\ Y_{world} \\ Z_{world} \\ 1 \end{bmatrix} \quad (13)$$

$$= \begin{bmatrix} q_{11} & q_{12} & q_{13} & q_{14} \\ q_{21} & q_{22} & q_{23} & q_{24} \\ q_{31} & q_{32} & q_{33} & q_{34} \end{bmatrix}\begin{bmatrix} X_{world} \\ Y_{world} \\ Z_{world} \\ 1 \end{bmatrix} \quad (14)$$

With reference, parameters obtained by the calibration will de described in detail. As shown a model sketch in FIG. 5(a), a lens 20 is set in front of a sensor 10 in a digital camera.

(1) Focus Distance f (mm)

As shown in FIG. 5(b), the focus distance f (mm) is a distance from the main point where all incident light beams are collected to a center position of the sensor 10.

(2) Displacement of the Main Point $x_p$, $y_p$ (mm)

As shown in FIG. 5(c), the displacement of the main point xp, yp (mm) is a displacement between an initial main point at a time when the camera is manufactured and a center position of the sensor. Such a displacement is indicated by two parameters as a translation distance in a x-y plane.

(3) Distortion Correction Coefficient in a Radial Direction $k_1$, $k_2$, $k_3$

As shown in FIG. 6(a), a lens 20 of the camera is a convex lens so that incident light beams are refracted and projected on different points on the sensor 10. Therefore, an occurrence of the distortion as shown in FIG. 6(b) is corrected by three coefficients $k_1$, $k_2$ and $k_3$. In FIG. 6(b), an image at a time before the distortion correction is operated is shown as a real line and an image at a time after the distortion correction is operated is correctly shown as a broken line.

(4) Distortion Correction Coefficient in a Tangential Direction $p_1$, $p_2$

As shown in FIG. 6(c), as similar as the displacement of the main point, the distortion in a tangential direction is caused while a camera is manufactured since the lens 20 and the sensor 10 are not arranged in parallel. Therefore, the distortion as shown in FIG. 6(d) is occurred. An occurrence of such a distortion is corrected by two coefficients $p_1$ and $p_2$. In FIG. 6(d), an image at a time before the distortion correction is operated is shown as a real line and an image at a time after the distortion correction is operated is correctly shown as a broken line.

<Detection of Interior Parameters of a Camera>

In order to extract the interior parameter of the camera, a calibration board 11 with a checked pattern as shown in FIG. 7 and a calibration board 12 with circulars arranged in a grating pattern as shown in FIG. 8.

1) As shown in FIG. 9(a) through FIG. 9(e), the calibration board 11 is moved and rotated in front of a camera so as to be taken about ten pictures by the camera. In such a case, the calibration board 11 with a checked pattern as shown in FIG. 7 is utilized. In FIG. 9(a) through FIG. 9(e), each left side sketches show that the calibration board 11 is moved and rotated with respect to the camera 30. In FIG. 9(a) through FIG. 9(e), each right side sketches show images photographed by the camera 30.
2) As shown in FIG. 10, each crossing points in the checked pattern (dot x in FIG. 10) are extracted as characteristic points from each photographed image.
3) Judging from position information of character points in the each photographed image, interior parameters of the camera 30 such as the focus distance: ($f \times k_x$, $f \times k_y$), distortion of the main point: ($c_x$, $c_y$), and distortion correction coefficient in a tangential direction: ($p_1$, $p_2$) are detected by utilizing the least square method and so on.
4) Image correction by the calibration In accordance with the interior parameters of the camera determined by the above process, the photographed image as shown in FIG. 11(a) is corrected to an image as shown in FIG. 11(b).

<Determination of Exterior Parameters of a Camera>

1) After setting a camera at a machining tool, a calibration board is set on a table. As described in the following third item, "coordination position" measures a point already known in machine coordination.
2) As shown in FIG. 12, the position of the camera is moved along a x-axis, a y-axis and a z-axis so that a plurality of images of the calibration board 11 are obtained as shown in FIG. 13(a) through FIG. 13(d).
3) Judging from the each obtained images, the characteristic points x in FIG. 14 and the points o as shown in FIG. 14 of which the coordination are already known are extracted. A number of the characteristic points x are seventy points that is same to a number of the crossing points (7×10=70) in the checked pattern. A number of the point o is four. Each one point o is located at each corner (right lower, right upper, left upper and left lower) in FIG. 14, respectively.
4) Judging from the position information of the characteristic points and the points of which coordination are already known in each obtained image, exterior parameters such as translation distance of the camera (tx, ty, tz) and traveling angle of a rotated camera (θx, θy, θz) are determined.

In a conventional art as described above, the interior parameters of the camera such as focus distance: ($f \times k_x$, $f \times k_y$), displacement of main point: (cx, cy), distortion correction coefficient in a radial direction: (k1, k2, k3) and distortion correction coefficient in a tangential direction: (p1, p2), and the exterior parameters of the camera such as translation distance of the camera: (tx, ty, tz) and rotational angle of the camera: (θx, θy, θz) are necessary determined. In order to determine those parameters, there is a problem that a calibration method has to be complicated.

Means to Solve the Invention

In order to accomplish the subject described above, a method for calibrating camera measurement system according to the present invention recited in claim 1 is characterized of comprising: setting a ring-shaped calibration jig at a workpiece on a machining tool; aligning an optical axis of a camera parallel to a single axis of a coordinate system of the machining tool and also aligning a horizontal direction or a vertical direction of the camera with an axial direction other than a direction of the single axis of the machining tool wherein an image of the calibration jig is photographed using the camera; extracting a circumferential shape of the calibration jig in the image as a contour; calculating a center position of the calibration jig in the image from the contour while all the distortion correction coefficients in a tangential direction of the camera and all the distortion correction coefficients in a radial direction of the camera are ignored and set to zero; and calculating a translation distance as an external parameter of calibration on the basis of the center position of the calibration jig in the image and a known three-dimensional center position of the calibration jig.

In order to accomplish the subject described above, a method for calibrating camera measurement system according to the present invention as recited in claim 2 is characterized of comprising: setting a ring-shaped calibration jig at a workpiece on a machining tool; moving a camera parallel to a X-axis, Y-axis and Z-axis of the coordinate system of the machining tool, while a plurality of images of the calibration jig are photographed by the camera; extracting a circumferential shape of the calibration jig in the image as a contour; calculating a center position of the calibration jig in the image from the contour while all the distortion correction coefficients in a tangential direction of the camera and all the distortion correction coefficients in a radial direction of the camera are ignored and set to zero; and calculating a rotation angle and a translation distance as an external parameter of calibration on the basis of the center position of the calibration jig in the image and a known three-dimensional center position of the calibration jig.

Effect of the Invention

According to the present invention, a calibration jig is a ring-shape so that a ring-shaped calibration jig can be manufactured easily and the calibration jig can be attached easily.

Further, in the present invention, the distortion correction coefficient in a tangential direction and the distortion correction coefficient in a radial direction are ignored and set zero and the displacements of the main point of a camera are all set to zero and are included in the translation distance of the camera. Thus, the calibration can be operated in a simple method.

Further, in the present invention, when a camera is attached, an optical axis of the camera is aligned parallel to a single axis of the coordinate system of the machining tool (hereinafter, it is referred as "machine coordination"). It is unnecessary to correct three exterior parameters (rotation).

On the other hand, in the case that a relation between the camera coordination and the machine coordination is unrelated, three exterior parameters (rotation) are determined.

BRIEF DESCRIPTION OF THE DRAWING

FIG. 1(a) is a perspective view for showing how a calibration jig using a camera according to the present invention measures. FIG. 1(b) shows a contour of a circumferential of a circle extracted from an image and a center position calculated from the circumferential of the circle extracted in the present invention.

FIG. 2 is a perspective view for measuring a center position of a hole by a touch sensor in a conventional art.

FIG. 5(a) is a sketched model of a digital camera, FIG. 5(b) explains a focus distance and FIG. 5(c) shows a displacement of the main point.

FIG. 16 is a flow chart for explaining a calibration method in the third embodiment according to the present invention.

EMBODIMENT TO DO THE PRESENT INVENTION

In the present invention, a ring-shaped calibration jig 1 as shown in FIG. 1(a) is photographed by a camera 2. A contour 1a of a circumference of a circle of an image photographed (shown as an alternate long and short dash line in FIG. 1(b)) is extracted. A center position 1b of the calibration jig 1 is calculated based on the extracted contour 1a of the circumference of the circle.

Figure 3A:
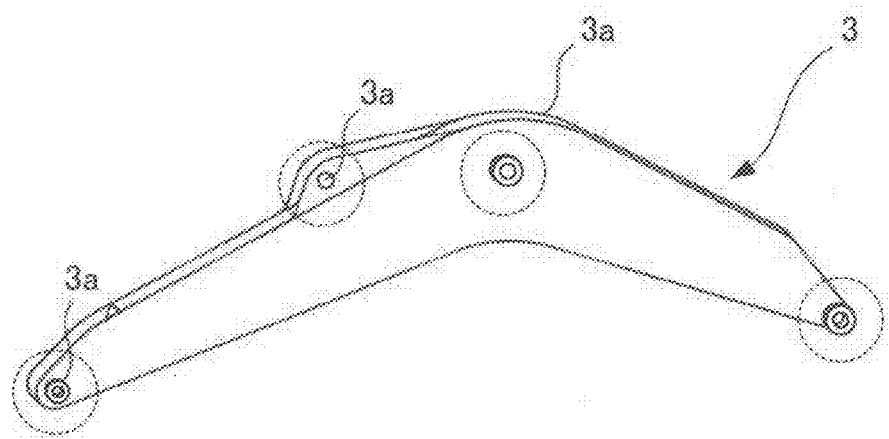
FIG. 3(a) is a perspective view for showing a front side of a boom of a hydro pressure shovel and FIG. 3(b) is a perspective view for showing a rear side of the boom of the hydro pressure shovel.
Figure 3B:
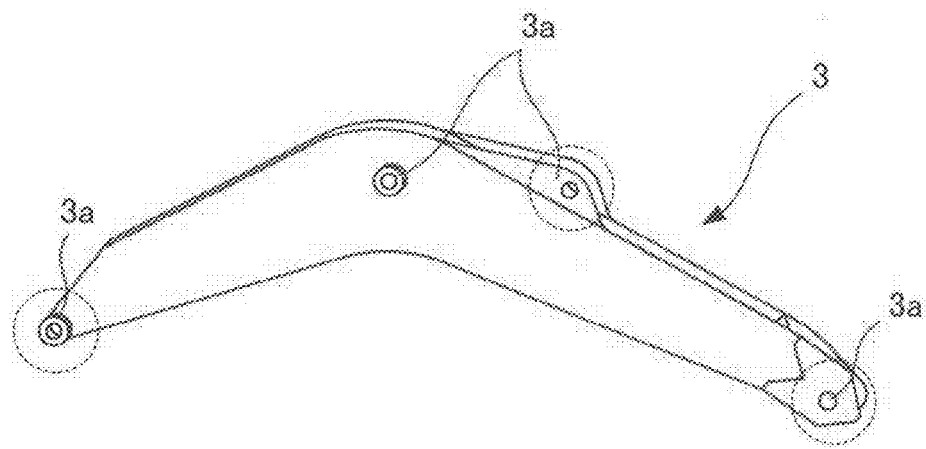
Figure 3C:
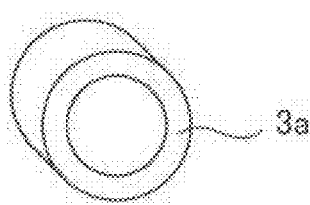
FIG. 3(c) is an enlarged perspective view of a portion in broken circles in FIGS. 3(a) and 3(b).
Figure 4:
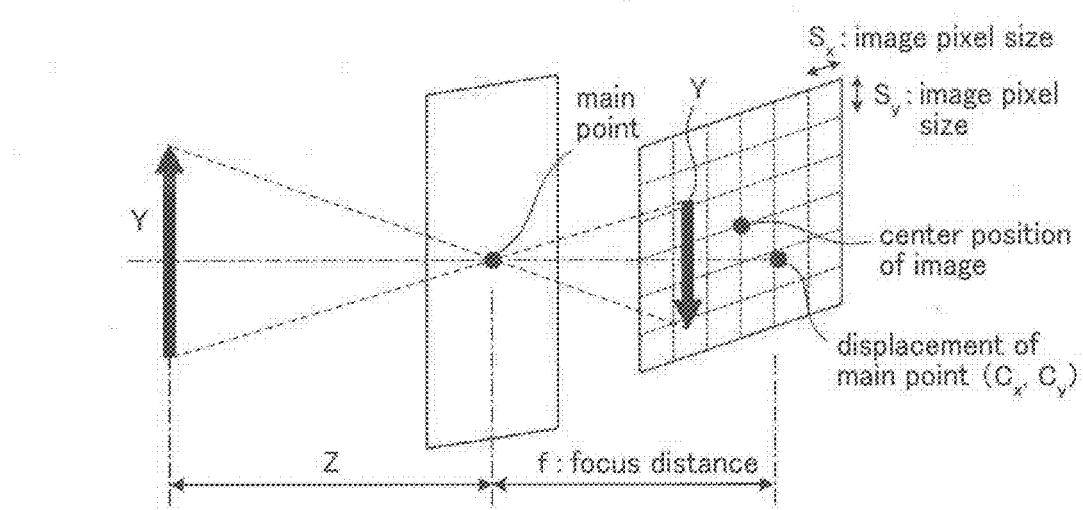
FIG. 4 shows a displacement between a focus point and a main point.
Figure 6A:
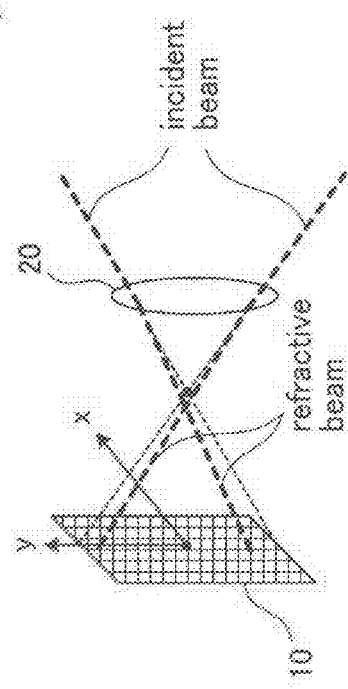
FIG. 6(a) explains a distortion correction coefficient in a radial direction.
Figure 6B:
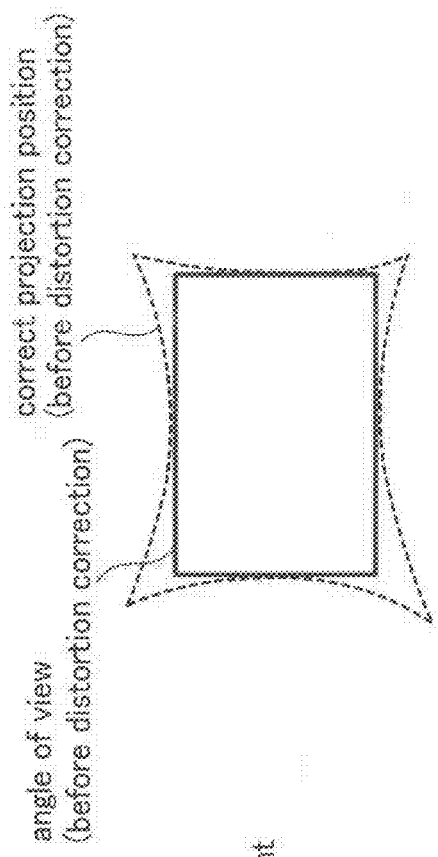
FIG. 6(b) explains a sketch for showing an image before correcting the distortion in the radial direction and an image after correcting the distortion in the radial direction.
Figure 6C:
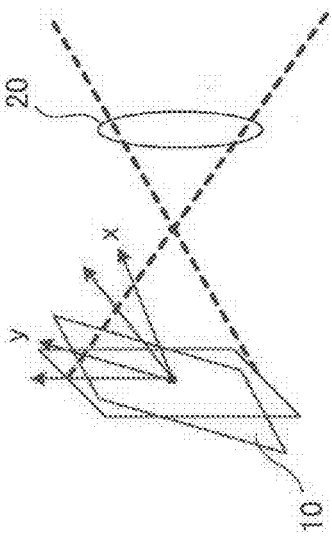
FIG. 6(c) explains a distortion correction coefficient in a tangential direction.
Figure 6D:
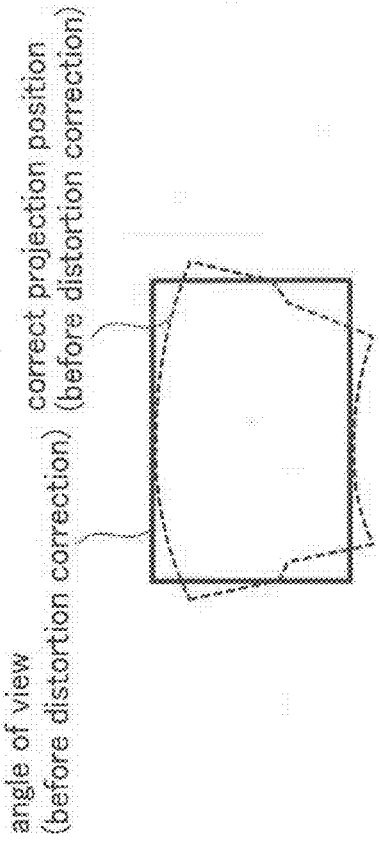
FIG. 6(d) explains a sketch for showing an image before correcting the distortion in the tangential direction and an image after correcting the distortion in the tangential direction.

As a ring-shaped calibration jig 1, for example, a cylindrical member 3a provided at a boom 3 of a hydro pressure shovel as shown in FIG. 3 can be utilized.

The boom 3 of the hydro pressure shovel is simultaneously machined at the both sides of the boom 3 by an opposed arranged machine utilized for processing a construction equipment (a moving column type opposed arranged boring milling machine, a moving table type opposed arranged horizontal boring milling machine and so on). In the conventional art as shown in FIG. 3, a center position of a hole is measured by attaching four touch sensors 4 along an inner peripheral surface of a cylindrical member 3a. Therefore, a measurement operation becomes more complicatedly.

Figure 7:
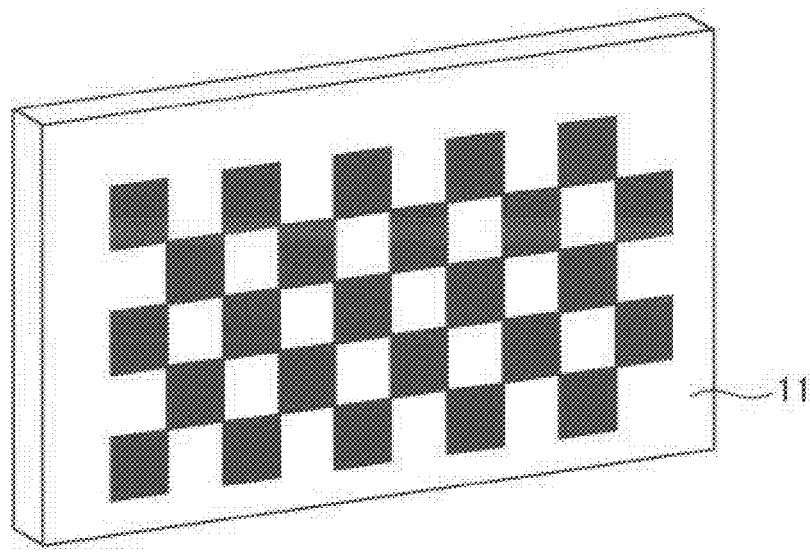
FIG. 7 is a perspective view of a calibration board with a checked pattern.
Figure 8:
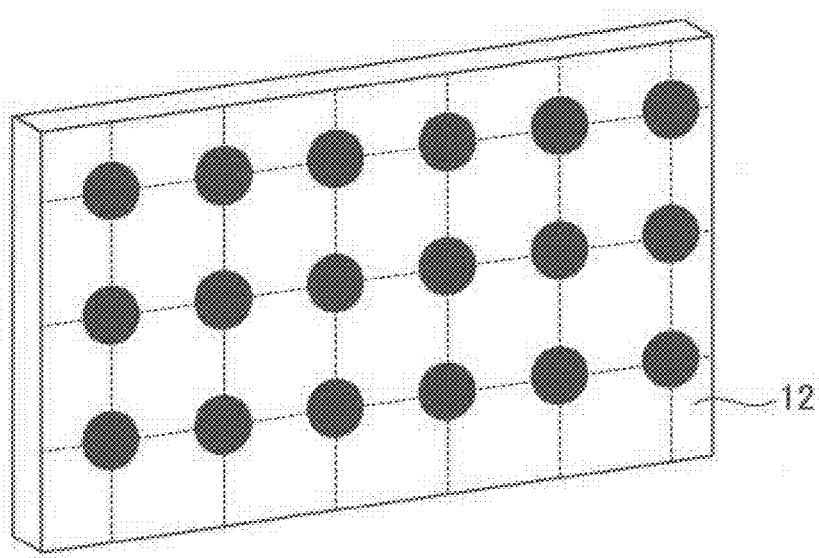
FIG. 8 is a perspective view of a calibration board with circles arranged in a checked pattern.
Figure 9A:
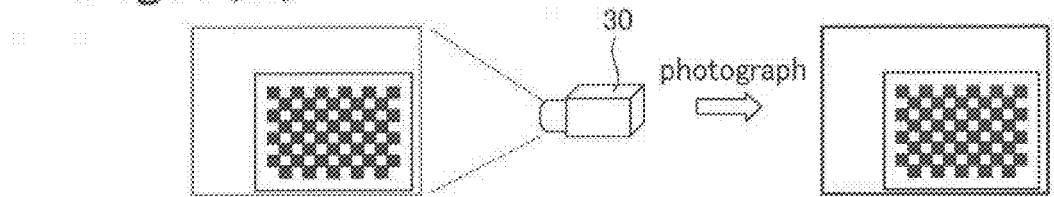
FIG. 9(a) through FIG. 9(e) show how necessary interior parameters are extracted from each obtained image and the respective obtained image.
Figure 9B:
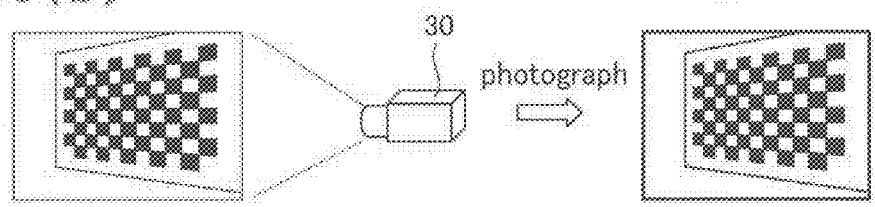
Figure 9C:
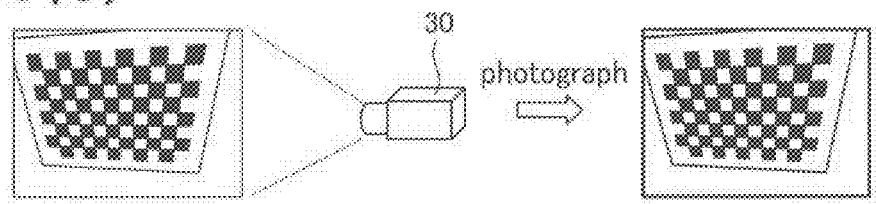
Figure 9D:
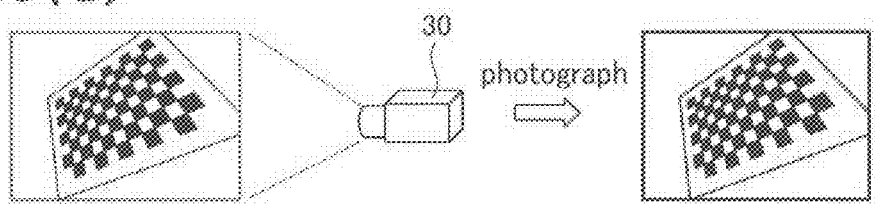
Figure 9E:
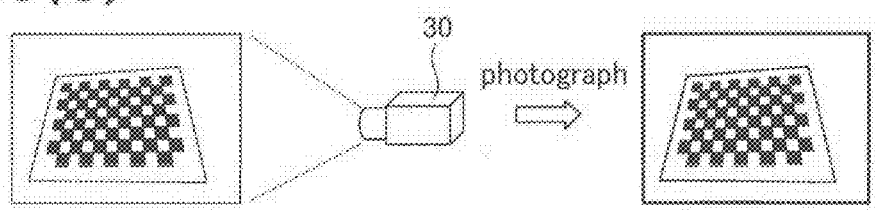
Figure 10:
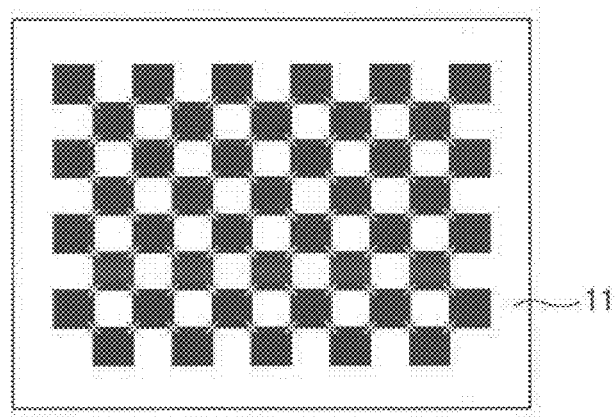
FIG. 10 shows how characteristic points are extracted from the obtained image.
Figure 11A:
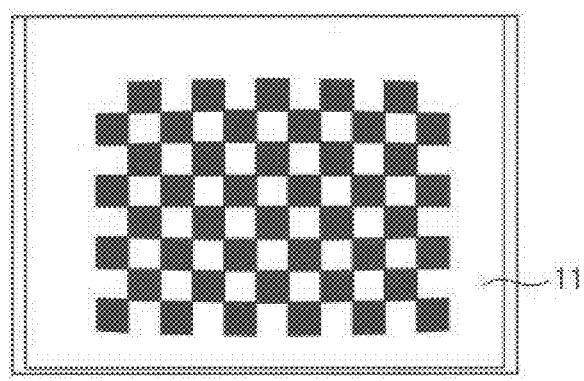
FIG. 11(a) shows a calibration board before processing a calibration operation.
Figure 11B:
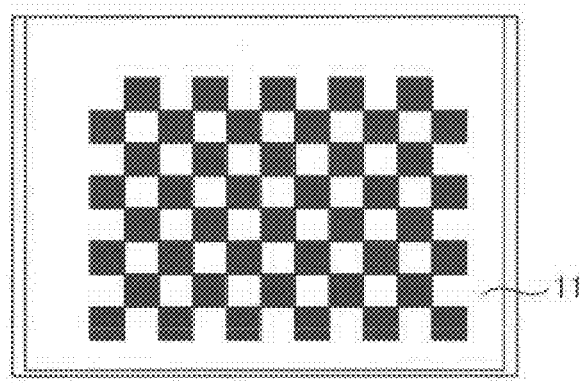
FIG. 11(b) shows the calibration board after processing the calibration operation.
Figure 12:
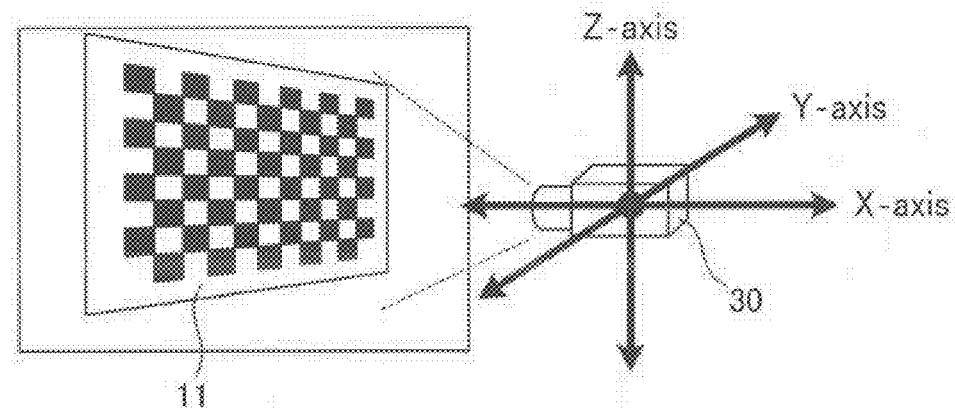
FIG. 12 explains how a necessary image to extract exterior parameter is obtained.
Figure 13A:
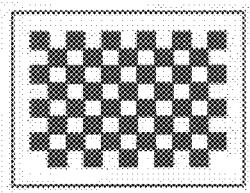
FIG. 13(a) through FIG. 13(d) show images from which necessary exterior parameters are extracted.
Figure 13B:
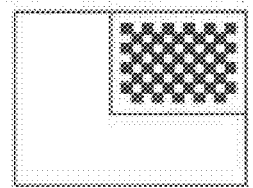
Figure 13C:
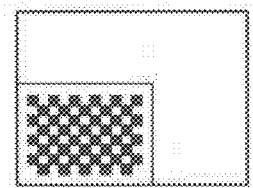
Figure 13D:
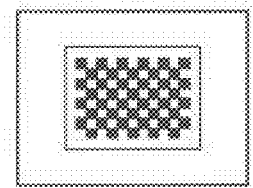
Figure 14:
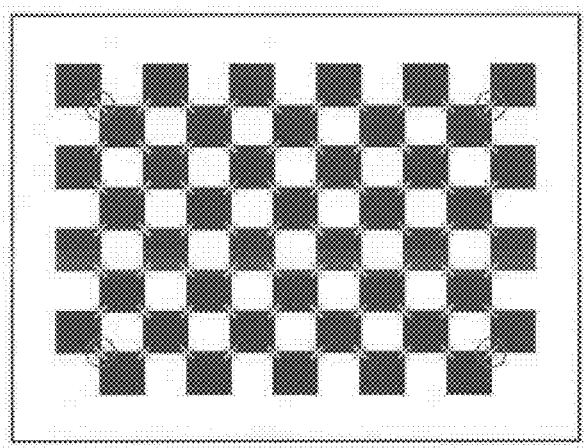
FIG. 14 explains how the characteristic points are extracted from the obtained image.

In the present invention, a ring-shaped calibration jig 1 is employed. On the other hand, a calibration board as shown in FIG. 7 and FIG. 8 is not utilized since such a calibration board has some difficulty in view of a manufacture and an attaching process. Concerning with the ring-shaped calibration jig 1, it is possible to use a cylindrical member 3a into which an axis is completely penetrated of a boom 3 of a hydro pressure shovel and a cylindrical member into which an axis is not penetrated.

In the present invention, the ring shaped calibration jig 1 is photographed by a camera 2. A shape to be measured is only suitable for a hole shape, so that a camera calibration can be omitted. That is, it is possible to ignore distortion correction coefficients in a tangential direction and distortion correction coefficients in a radial direction and set to zero. A displacement of a main point of the camera may be included in a translation distance of a camera and set to zero.

As described above, the interior parameters of the camera are determined so as to correct a lens distortion in the camera calibration. In the case that the measured object is a circular shape and a center position of the circular shape is measured, an influence caused by the calibration is little. Therefore, the distortion correction can be omitted.

In the present invention, when the camera 2 is attached, an optical axis of the camera 2 is aligned parallel to a z-axis of the machine coordination. Further, a perpendicular line of the camera is aligned along a x-axis of the machine coordination and a parallel line of the camera is aligned along a y-axis of the machine coordination so that it is unnecessary to correct three parameters (rotation) in the camera calibration Thus, by specifically setting a relation between the coordination of the camera 2 and a machine coordination as described above, within the exterior parameters (θx, θy, θz, tx, ty, tz) of the camera, three exterior parameters can be set to zero (θx=0, θy=0, θz=0). The determined parameters are only three translate parameters (tx, ty, tz).

Further, if the parameter tx is already known, two unknown parameters (tx, ty) are determined.

Herein, a center position 1b of the calibration jig 1 in an image has been already determined. If a known center position (Zr, Yr, Zr) of the calibration ring is designated as a center position, the unknown parameters (tx, ty) still remained can be determined.

In the present invention, if the coordination of the camera 2 is unrelated with respect to the machine coordination in the case that the camera 2 is set, it is necessary to determine six exterior parameters (θx, θy, θz, tx, ty, tz) of the camera 2.

In such a case, the camera 2 is translated parallel to the X-axis, Y-axis and Z-axis of the machine coordination while a plurality of images of the calibration jig 1 are photographed. Then, a contour of the calibration jig 1 is extracted as a circumference of the circle 1a in each photographed image so as to calculate a center position 1b of the calibration jig 1 based on the circumferential of the circle 1a. By repeating such a process, a known center position 1b of the calibration jig 1 in the photographed image is utilized to a center position (Xr, Yr, Zr) of the calibration jig 1 so that six exterior parameters (θx, θy, θz, tx, ty, tz) can be determined.

As described above, in the present invention, by utilizing a ring-shaped calibration jig, an influence of a camera calibration can be omitted and an operation of the calibration can be simplified.

Embodiment 1

1) The present invention is exclusively used to measure a shape of a hole, interior parameters in a camera (focus distance: (f×$k_x$, f×$k_y$), displacement of a main point: ($c_x$, $c_y$), distortion correction coefficient in a radial direction: ($k_1$, $k_2$, $k_3$), distortion correction coefficient in a tangential direction: ($p_1$, $p_2$)) are specifically set as follows:

(1) Regarding a camera and a lens within the camera, a distortion in a tangential direction is little so that distortion correction coefficient in a tangential direction: (p1, p2) can be ignored and the all set to zero.

(2) A purpose of the measurement according to the present invention is to measure a shape of a hole wherein a measured shape of the hole is aligned at a central portion of an image. Therefore, an influence of the distortion in the radial direction is not occurred. Therefore, in the system according to the present invention, there is no problem even if the all distortion correction coefficients in the radial direction: ($k_1$, $k_2$, $k_3$) are set to "zero".

(3) The displacement of the main point: ($c_x$, $c_y$) is included in the exterior parameter of the camera (translation distance: ($t_x$, $t_y$, $t_z$)) so that the displacement of the main point can be set as "zero".

(4) The focus distance: (f×$k_x$, f×$k_y$) depends on a specification of the lens and the camera. Therefore, necessary values are known in a specification listed by those manufactures.

Based on the above situation,

[No. 8]

$$S\begin{bmatrix} U_{image} \\ V_{image} \\ 1 \end{bmatrix} = \begin{bmatrix} k_x & 0 & 0 \\ 0 & k_y & 0 \\ 0 & 0 & 1 \end{bmatrix}\begin{bmatrix} f & 0 & 0 & 0 \\ 0 & f & 0 & 0 \\ 0 & 0 & 1 & 0 \end{bmatrix}\begin{bmatrix} X_{camera} \\ Y_{camera} \\ Z_{camera} \\ 1 \end{bmatrix} \quad (21)$$

$$= \begin{bmatrix} fk_x & 0 & 0 & 0 \\ 0 & fk_y & 0 & 0 \\ 0 & 0 & 1 & 0 \end{bmatrix}\begin{bmatrix} X_{camera} \\ Y_{camera} \\ Z_{camera} \\ 1 \end{bmatrix}$$

And,

[No. 9]

$$X_{camera} = (1 + k_1 r^2 + k_2 r^4 + k_3 r^6)X_c + p_1(r^2 + 2X_c^2) + 2p_2 X_c Y_c = X_c \quad (22)$$
$$(\because k_1 = 0, k_2 = 0, k_3 = 0, p_1 = 0, p_2 = 0)$$

$$Y_{camera} = (1 + k_1 r^2 + k_2 r^4 + k_3 r^6)Y_c + p_2(r^2 + 2Y_c^2) + 2p_1 X_c Y_c = Y_c \quad (23)$$
$$(\because k_1 = 0, k_2 = 0, k_3 = 0, p_1 = 0, p_2 = 0)$$

$$Z_{camera} = Z_c \quad (24)$$

Under the above condition, the calibration is processed. As shown in FIG. 1(a), a ring-shaped calibration jig 1 is photographed by a camera 1. As shown an alternate long and short dash line in FIG. 1(b), a contour 1a of a circumference of a circle is extracted from a photographed image. Judging from the contour 1a of an extracted circumference, a center position 1b of the calibration jig 1 is calculated.

Further, focus distance: (f×$k_x$, f×$k_y$) is already known based on the specification of a lens and the camera.

Figure 15:
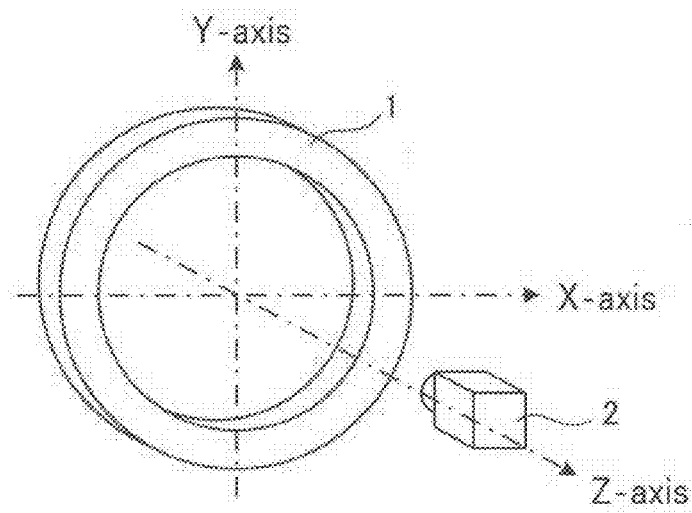
FIG. 15 is a perspective view for showing hoe a camera is arranged with respect to a calibration jig in the present invention.

2) As shown in FIG. 15, an optical axis of the camera 2 is aligned on the Z-axis of the machine coordination and a horizontal direction of the camera 2 is arranged on the X-axis of the machine coordination to mount the camera 2. A distance between the camera and the calibration jig 1 is substantially constant and then the parameter: tz is recognized as known. Thus, θx=0, θy=0, and θz=0.

[No. 10]
Exterior paramater(rotation):

$$\vec{R} = \begin{bmatrix} r_{11} & r_{12} & r_{13} \\ r_{21} & r_{22} & r_{23} \\ r_{31} & r_{32} & r_{33} \end{bmatrix} \quad (25)$$

$$= \begin{bmatrix} \cos\partial z & -\sin\partial z & 0 \\ \sin\partial z & \cos\partial z & 0 \\ 0 & 0 & 1 \end{bmatrix}\begin{bmatrix} \cos\partial y & 0 & \sin\partial y \\ 0 & 1 & 0 \\ -\sin\partial y & 0 & \cos\partial y \end{bmatrix}$$

$$\begin{bmatrix} 1 & 0 & 0 \\ 0 & \cos\partial x & -\sin\partial x \\ 0 & \sin\partial x & \cos\partial x \end{bmatrix}$$

$$= \begin{bmatrix} 1 & 0 & 0 \\ 0 & 1 & 0 \\ 0 & 0 & 1 \end{bmatrix}\begin{bmatrix} 1 & 0 & 0 \\ 0 & 1 & 0 \\ 0 & 0 & 1 \end{bmatrix}\begin{bmatrix} 1 & 0 & 0 \\ 0 & 1 & 0 \\ 0 & 0 & 1 \end{bmatrix}$$

$$= \begin{bmatrix} 1 & 0 & 0 \\ 0 & 1 & 0 \\ 0 & 0 & 1 \end{bmatrix}$$

-continued

[No. 11]

$$S\begin{bmatrix} U_{image} \\ V_{image} \\ 1 \end{bmatrix} = \begin{bmatrix} fk_x & 0 & 0 & 0 \\ 0 & fk_y & 0 & 0 \\ 0 & 0 & 1 & 0 \end{bmatrix} \begin{bmatrix} X_{camera} \\ Y_{camera} \\ Z_{camera} \\ 1 \end{bmatrix} \quad (26)$$

$$= \begin{bmatrix} fk_x & 0 & 0 & 0 \\ 0 & fk_y & 0 & 0 \\ 0 & 0 & 1 & 0 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} X_{world} \\ Y_{world} \\ Z_{world} \\ 1 \end{bmatrix}$$

$$= \begin{bmatrix} fk_x & 0 & 0 & 0 \\ 0 & fk_y & 0 & 0 \\ 0 & 0 & 1 & 0 \end{bmatrix} \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} X_{world} \\ Y_{world} \\ Z_{world} \\ 1 \end{bmatrix}$$

$$= \begin{bmatrix} fk_x & 0 & 0 & fk_x t_x \\ 0 & fk_y & 0 & fk_y t_y \\ 0 & 0 & 1 & t_z \end{bmatrix} \begin{bmatrix} X_{world} \\ Y_{world} \\ Z_{world} \\ 1 \end{bmatrix}$$

Accordingly, determined parameters are

[No. 12]

Exterior parameter (translation):

$$\vec{T} = \begin{bmatrix} t_x \\ t_y \\ t_z \end{bmatrix}$$

Further, the parameter tz can be recognized as known. Therefore, two parameters (tx, ty) are determined.

3) By setting the center position ($X_r$, $Y_r$, $Z_r$) of the calibration ring already known as a center position, the parameters (tx, ty) are calculated so as to match with a coordination ($U_{ring}$, $V_{ring}$) of the center position 1b in a plane of an image of the calibration jig 1 photographed by the camera 2.

[No. 13]

$$S\begin{bmatrix} U_{image} \\ V_{image} \\ 1 \end{bmatrix} = \begin{bmatrix} fk_x & 0 & 0 & fk_x t_x \\ 0 & fk_y & 0 & fk_y t_y \\ 0 & 0 & 1 & t_z \end{bmatrix} \begin{bmatrix} X_{world} \\ Y_{world} \\ Z_{world} \\ 1 \end{bmatrix} \quad (27)$$

$$S\begin{bmatrix} U_{Ring} \\ V_{Ring} \\ 1 \end{bmatrix} = \begin{bmatrix} fk_x & 0 & 0 & fk_x t_x \\ 0 & fk_y & 0 & fk_y t_y \\ 0 & 0 & 1 & t_z \end{bmatrix} \begin{bmatrix} Xr \\ Yr \\ Zr \\ 1 \end{bmatrix}$$

Embodiment 2

1) The present invention is exclusively used to measure a shape of a hole, interior parameters in a camera (focus distance: ($f \times k_x$, $f \times k_y$), displacement of a main point: (cx, cy), distortion correction coefficient in a radial direction: ($k_1$, $k_2$, $k_3$), distortion correction coefficient in a tangential direction: ($p_1$, $p_2$)) are specifically set as follows:

(1) Regarding a camera and a lens within the camera, a distortion in a tangential direction is little so that distortion correction coefficient in a tangential direction: (p1, p2) can be ignored and the all set to zero.

(2) A purpose of the measurement according to the present invention is to measure a shape of a hole wherein a measured shape of the hole is aligned at a central portion of an image. Therefore, an influence of the distortion in the radial direction is not occurred. Therefore, in the system according to the present invention, there is no problem even if the all distortion correction coefficients in the radial direction: (k1, k2, k3) are set to "zero".

(3) The displacement of the main point: ($c_x$, $c_y$) is included in the exterior parameter of the camera (translation distance: (tx, ty, tz)) so that the displacement of the main point can be set as "zero".

(4) The focus distance: ($f \times k_x$, $f \times k_y$) depends on a specification of the lens and the camera. Therefore, necessary values are known in a specification listed by those manufactures.

Based on the above situation,

[No. 14]

$$S\begin{bmatrix} U_{image} \\ V_{image} \\ 1 \end{bmatrix} = \begin{bmatrix} k_x & 0 & 0 \\ 0 & k_y & 0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} X_{camera} \\ Y_{camera} \\ Z_{camera} \\ 1 \end{bmatrix} \quad (31)$$

$$= \begin{bmatrix} fk_x & 0 & 0 & 0 \\ 0 & fk_y & 0 & 0 \\ 0 & 0 & 1 & 0 \end{bmatrix} \begin{bmatrix} X_{camera} \\ Y_{camera} \\ Z_{camera} \\ 1 \end{bmatrix}$$

And,

[No. 15]

$$X_{camera} = (1 + k_1 r^2 + k_2 r^4 + k_3 r^6) X_c + p_1(r^2 + 2X_c^2) + 2p_2 X_c Y_c = X_c \quad (32)$$
$$(\because k_1 = 0, k_2 = 0, k_3 = 0, p_1 = 0, p_2 = 0)$$

$$Y_{camera} = (1 + k_1 r^2 + k_2 r^4 + k_3 r^6) Y_c + p_2(r^2 + 2Y_c^2) + 2p_1 X_c Y_c = Y_c \quad (33)$$
$$(\because k_1 = 0, k_2 = 0, k_3 = 0, p_1 = 0, p_2 = 0)$$

$$Z_{camera} = Z_c \quad (34)$$

Under the above condition, the calibration is processed. As shown in FIG. 1(a), a ring-shaped calibration jig 1 is photographed by a camera 1. As shown an alternate long and short dash line in FIG. 1(b), a contour 1a of a circumference of a circle is extracted from a photographed image. Judging from the contour 1a of an extracted circumference, a center position 1b of the calibration jig 1 is calculated.

Further, focus distance: ($f \times k_x$, $f \times k_y$) is already known based on the specification of a lens and the camera.

2) As shown in FIG. 15, an optical axis of the camera 2 is closely aligned on the Z-axis of the machine coordination (it is unnecessary to match the optical axis with the Z-axis completely) so as to set the camera 2. A horizontal direction of the camera 2 is closely aligned on the X-axis of the machine coordination ($\theta x \neq 0$, $\theta y \neq 0$, $\theta z \neq 0$). Accordingly, determined parameters are six exterior parameters ($\theta x$, $\theta y$, $\theta z$, tx, ty, tz).

[No. 16]

$$S\begin{bmatrix} U_{image} \\ V_{image} \\ 1 \end{bmatrix} = \begin{bmatrix} fk_x & 0 & 0 & 0 \\ 0 & fk_y & 0 & 0 \\ 0 & 0 & 1 & 0 \end{bmatrix} \begin{bmatrix} X_{camera} \\ Y_{camera} \\ Z_{camera} \\ 1 \end{bmatrix} \quad (35)$$

$$= \begin{bmatrix} fk_x & 0 & 0 & 0 \\ 0 & fk_y & 0 & 0 \\ 0 & 0 & 1 & 0 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} X_{world} \\ Y_{world} \\ Z_{world} \\ 1 \end{bmatrix}$$

[No. 17]

Exterior paramter(rotation):

$$\vec{R} = \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} \cos\vartheta z & -\sin\vartheta z & 0 \\ \sin\vartheta z & \cos\vartheta z & 0 \\ 0 & 0 & 1 \end{bmatrix} \begin{bmatrix} \cos\vartheta y & 0 & \sin\vartheta y \\ 0 & 1 & 0 \\ -\sin\vartheta y & 0 & \cos\vartheta y \end{bmatrix}$$

$$\begin{bmatrix} 1 & 0 & 0 \\ 0 & \cos\vartheta x & -\sin\vartheta x \\ 0 & \sin\vartheta x & \cos\vartheta x \end{bmatrix}$$

Exterior parameter(translation):

$$\vec{T} = \begin{bmatrix} t_x \\ t_y \\ t_z \end{bmatrix}$$

3) By setting the center position $(X_r, Y_r, Z_r)$ of the calibration ring already known as a center position, the parameters ($\theta x$, $\theta y$, $\theta z$, tx, ty, tz) are calculated.

In a specific case as shown in FIG. 15, several images are photographed by the calibration jig 1 while a camera 2 is moved parallel to the X-axis, Y-axis and the Z-axis while. In each photographed image, a contour 1a of a circumference of a circle is extracted. Based on the contour 1a of an extracted circumferential of the circle, a center position 1b of the calibration jig 1 is calculated.

A center position of the calibration ring is already known so that the parameters ($\theta x$, $\theta y$, $\theta z$, tx, ty, tz) can be determined by the each center position 1b of the calibration jig 1 calculated respectively in the least square method.

Embodiment 3

FIG. 16 shows the third embodiment of the present invention. FIG. 16 is a flow chart for showing a calibration method according to the present invention.

As shown in FIG. 1(a), a camera 2 is positioned near a center position of a calibration jig 1 (STEP S1). The calibration jig 1 is previously set on a workpiece on a machining tool, for instance a boom 3 of a hydro pressure shovel as shown in FIG. 3. As shown in FIG. 15, a relation between the coordination of the camera 2 and a machine coordination may be specifically related (Embodiment 1) or may be unrelated (Embodiment 2).

In the next, an image of the calibration jig 1 is photographed by a camera 2 (STEP S2).

Then, as shown in FIG. 1(b), a contour 1a of a circumferential of a circle setting a ring-shaped calibration jig at a workpiece on a machining tool is extracted by processing an image photographed by the camera (STEP S3).

Then, as shown in FIG. 1(b), a center position 1b of the calibration jig 1 is calculated judging from the contour 1a of the circumferential of the circle (STEP S4).

Concerning with calibration parameters excluding the interior parameter of the camera, position calibration parameters (the exterior parameters) of the camera is detected judging from the center position (Xr, Yr, Zr) of the calibration jig 1 already known as the position of the machine coordination and the center position 1b of the calibration jig calculated in the STEP S4 (STEP S5).

In the case that a relation between the coordination system of the camera 2 and the machine coordination system is a specifically related, $\theta x=0$. $\theta y=0$ and $\theta z=0$. The detected exterior parameters are only translation distance. In the case that the parameter: tz is already known, the parameters (tx, ty) can be determined based on one image.

On the other hand, in the case that a relation between the coordination system of the camera 2 and the machine coordination system is unrelated, detected parameters are six exterior parameters ($\theta x$, $\theta y$, $\theta z$, tx, ty, tz). Therefore, several images of the calibration jig 1 are photographed so as to determine each exterior parameter, respectively.

INDUSTRIAL USE OF THE INVENTION

The present invention can be broadly utilized as a calibration method for a system for measuring a shape of a hole (a center position of a hole) in a tool machine industry.

EXPLANATION OF NUMERAL 1 calibration jig
1a contour of circumference of circle
1b center position of calibration jig
2 camera
3 boom of hydro pressure shovel
3a cylindrical portion
10 sensor
11, 12 calibration board
20 lens
30 camera

The invention claimed is:

1. A method for calibrating a camera measurement system having a single camera comprising:
setting a ring-shaped calibration jig at a workpiece on a machining tool;
aligning an optical axis of said camera parallel to a single axis of a coordinate system of said machining tool and also aligning a horizontal direction or a vertical direction of said camera with an axial direction other than a direction of said single axis of said machining tool wherein an image of said calibration jig is aligned at a central portion of an image and photographed using said camera;
extracting a circumferential shape of said calibration jig in said central portion of said image as a contour;
calculating a center position ($U_{Ring}$, $V_{Ring}$) of said calibration jig in said image from said contour; and
calculating a translation distance (tx, ty, tz) as an external parameter of calibration on the basis of said center position ($U_{Ring}$, $V_{Ring}$) of said calibration jig in said central portion of said image and a known three-dimensional center position ($X_r$, $Y_r$, $Z_r$) of said calibration jig, wherein all the distortion correction coefficients in a tangential direction of said camera and all the distortion correction coefficients in a radial direction of said camera are ignored and set to zero and displacement of the main point of a camera are all set to zero and are included in the translation distance of the camera as $$S\begin{bmatrix} U_{image} \\ V_{image} \\ 1 \end{bmatrix} = \begin{bmatrix} k_x & 0 & 0 \\ 0 & k_y & 0 \\ 0 & 0 & 1 \end{bmatrix}\begin{bmatrix} f & 0 & 0 & 0 \\ 0 & f & 0 & 0 \\ 0 & 0 & 1 & 0 \end{bmatrix}\begin{bmatrix} X_{camera} \\ Y_{camera} \\ Z_{camera} \\ 1 \end{bmatrix}$$

$$= \begin{bmatrix} fk_x & 0 & 0 & 0 \\ 0 & fk_y & 0 & 0 \\ 0 & 0 & 1 & 0 \end{bmatrix}\begin{bmatrix} X_{camera} \\ Y_{camera} \\ Z_{camera} \\ 1 \end{bmatrix}$$

$$S\begin{bmatrix} U_{image} \\ V_{image} \\ 1 \end{bmatrix} = \begin{bmatrix} fk_x & 0 & 0 & 0 \\ 0 & fk_y & 0 & 0 \\ 0 & 0 & 1 & 0 \end{bmatrix}\begin{bmatrix} X_{camera} \\ Y_{camera} \\ Z_{camera} \\ 1 \end{bmatrix}$$

$$= \begin{bmatrix} fk_x & 0 & 0 & 0 \\ 0 & fk_y & 0 & 0 \\ 0 & 0 & 1 & 0 \end{bmatrix}\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}\begin{bmatrix} X_{world} \\ Y_{world} \\ Z_{world} \\ 1 \end{bmatrix}$$

$$= \begin{bmatrix} fk_x & 0 & 0 & 0 \\ 0 & fk_y & 0 & 0 \\ 0 & 0 & 1 & 0 \end{bmatrix}\begin{bmatrix} 1 & 0 & 0 & t_x \\ 0 & 1 & 0 & t_y \\ 0 & 0 & 1 & t_z \\ 0 & 0 & 0 & 1 \end{bmatrix}\begin{bmatrix} X_{world} \\ Y_{world} \\ Z_{world} \\ 1 \end{bmatrix}$$

$$= \begin{bmatrix} fk_x & 0 & 0 & fk_x t_x \\ 0 & fk_y & 0 & fk_y t_y \\ 0 & 0 & 1 & t_z \end{bmatrix}\begin{bmatrix} X_{world} \\ Y_{world} \\ Z_{world} \\ 1 \end{bmatrix}$$

$$S\begin{bmatrix} U_{image} \\ V_{image} \\ 1 \end{bmatrix} = \begin{bmatrix} fk_x & 0 & 0 & fk_x t_x \\ 0 & fk_y & 0 & fk_y t_y \\ 0 & 0 & 1 & t_z \end{bmatrix}\begin{bmatrix} X_{world} \\ Y_{world} \\ Z_{world} \\ 1 \end{bmatrix}$$

$$S\begin{bmatrix} U_{Ring} \\ V_{Ring} \\ 1 \end{bmatrix} = \begin{bmatrix} fk_x & 0 & 0 & fk_x t_x \\ 0 & fk_y & 0 & fk_y t_y \\ 0 & 0 & 1 & t_z \end{bmatrix}\begin{bmatrix} Xr \\ Yr \\ Zr \\ 1 \end{bmatrix}$$

wherein, $k_x = 1/s_x$, $k_y = -1/s_y$, $s_x$ and $s_y$ indicates image pixel size and focus distance ($f \times k_x$, $f \times k_y$) is known based on the specification of a lens and the camera; and wherein $\vec{X}_{world} = [X_{world}, Y_{world}, Z_{world}, 1]^T$: Coordination of world coordination system $\vec{X}_{camera} = [X_{camera}, Y_{camera}, Z_{camera}, 1]^T$: Coordination of Camera coordination system $\vec{U}_{image} = [U_{image}, V_{image}, 1]^T$: Coordination projected on image plane and $\vec{R}$ and $\vec{T}$ are exterior parameters of the calibration, $\vec{R}$ indicating a rotational angle of a camera and $\vec{T}$ indicating a setting position as Exterior paramter(rotation):

$$\vec{R} = \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} \cos\vartheta z & -\sin\vartheta z & 0 \\ \sin\vartheta z & \cos\vartheta z & 0 \\ 0 & 0 & 1 \end{bmatrix}\begin{bmatrix} \cos\vartheta y & 0 & \sin\vartheta y \\ 0 & 1 & 0 \\ -\sin\vartheta y & 0 & \cos\vartheta y \end{bmatrix}$$

$$\begin{bmatrix} 1 & 0 & 0 \\ 0 & \cos\vartheta x & -\sin\vartheta x \\ 0 & \sin\vartheta x & \cos\vartheta x \end{bmatrix}$$

Exterior parameter(translation):

$$\vec{T} = \begin{bmatrix} t_x \\ t_y \\ t_z \end{bmatrix}$$

where $\theta_x$ is the rotational angle with respect to X-axis, $\theta_y$ is the rotational angle with respect to Y-axis and $\theta_z$ is the rotational angle with respect to Z-axis.

2. A method for calibrating a camera measurement system having a single camera comprising:
setting a ring-shaped calibration jig at a workpiece on a machining tool;
moving a camera parallel to a X-axis, Y-axis and Z-axis of the coordinate system of said machining tool, while a plurality of images of said calibration jig are aligned at a central portion of an image and photographed by said camera;
extracting a circumferential shape of said calibration jig in said central portion of said image as a contour;
calculating a center position ($U_{image}$, $V_{mage}$) of said calibration jig in said image from said contour; and
calculating a rotation angle (θx, θy, θz) and a translation distance (tx, ty, tz) as an external parameter of calibration on the basis of said center position ($U_{image}$, $V_{image}$) of said calibration jig in said central portion of said image and a known three-dimensional center position ($X_{world}$, $Y_{world}$, $Z_{world}$) of said calibration jig, wherein all the distortion correction coefficients in a tangential direction of said camera and all the distortion correction coefficients in a radial direction of said camera are ignored and set to zero and displacement of the main point of a camera are all set to zero and are included in the translation distance of the camera as $$S\begin{bmatrix} U_{image} \\ V_{image} \\ 1 \end{bmatrix} = \begin{bmatrix} fk_x & 0 & 0 & 0 \\ 0 & fk_y & 0 & 0 \\ 0 & 0 & 1 & 0 \end{bmatrix}\begin{bmatrix} X_{camera} \\ Y_{camera} \\ Z_{camera} \\ 1 \end{bmatrix}$$

$$= \begin{bmatrix} fk_x & 0 & 0 & 0 \\ 0 & fk_y & 0 & 0 \\ 0 & 0 & 1 & 0 \end{bmatrix}\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}\begin{bmatrix} X_{world} \\ Y_{world} \\ Z_{world} \\ 1 \end{bmatrix}$$

wherein, $k_x = 1/s_x$, $k_y = -1/s_y$, $s_x$ and $s_y$ indicates image pixel size and focus distance ($f \times k_x$, $f \times k_y$) is already known based on the specification of a lens and the camera, and wherein $\vec{X}_{world} = [X_{world}, Y_{world}, Z_{world}, 1]^T$: Coordination of world coordination system $\vec{X}_{camera} = [X_{camera}, Y_{camera}, Z_{camera}, 1]^T$: Coordination of Camera coordination system $\vec{U}_{image}=[U_{image}, V_{image}, 1]^T$: Coordination projected on image plane and $\vec{R}$ and $\vec{T}$ are exterior parameters of the calibration, $\vec{R}$ indicating a rotational angle of a camera and $\vec{T}$ indicating a setting position as Exterior paramter(rotation):

$$\vec{R} = \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} \cos\vartheta & -\sin\vartheta z & 0 \\ \sin\vartheta z & \cos\vartheta z & 0 \\ 0 & 0 & 1 \end{bmatrix} \begin{bmatrix} \cos\vartheta y & 0 & \sin\vartheta y \\ 0 & 1 & 0 \\ -\sin\vartheta y & 0 & \cos\vartheta y \end{bmatrix}$$

$$\begin{bmatrix} 1 & 0 & 0 \\ 0 & \cos\vartheta x & -\sin\vartheta x \\ 0 & \sin\vartheta x & \cos\vartheta x \end{bmatrix}$$

Exterior parameter(translation):

$$\vec{T} = \begin{bmatrix} t_x \\ t_y \\ t_z \end{bmatrix}.$$

* * * * *